Patented June 27, 1944

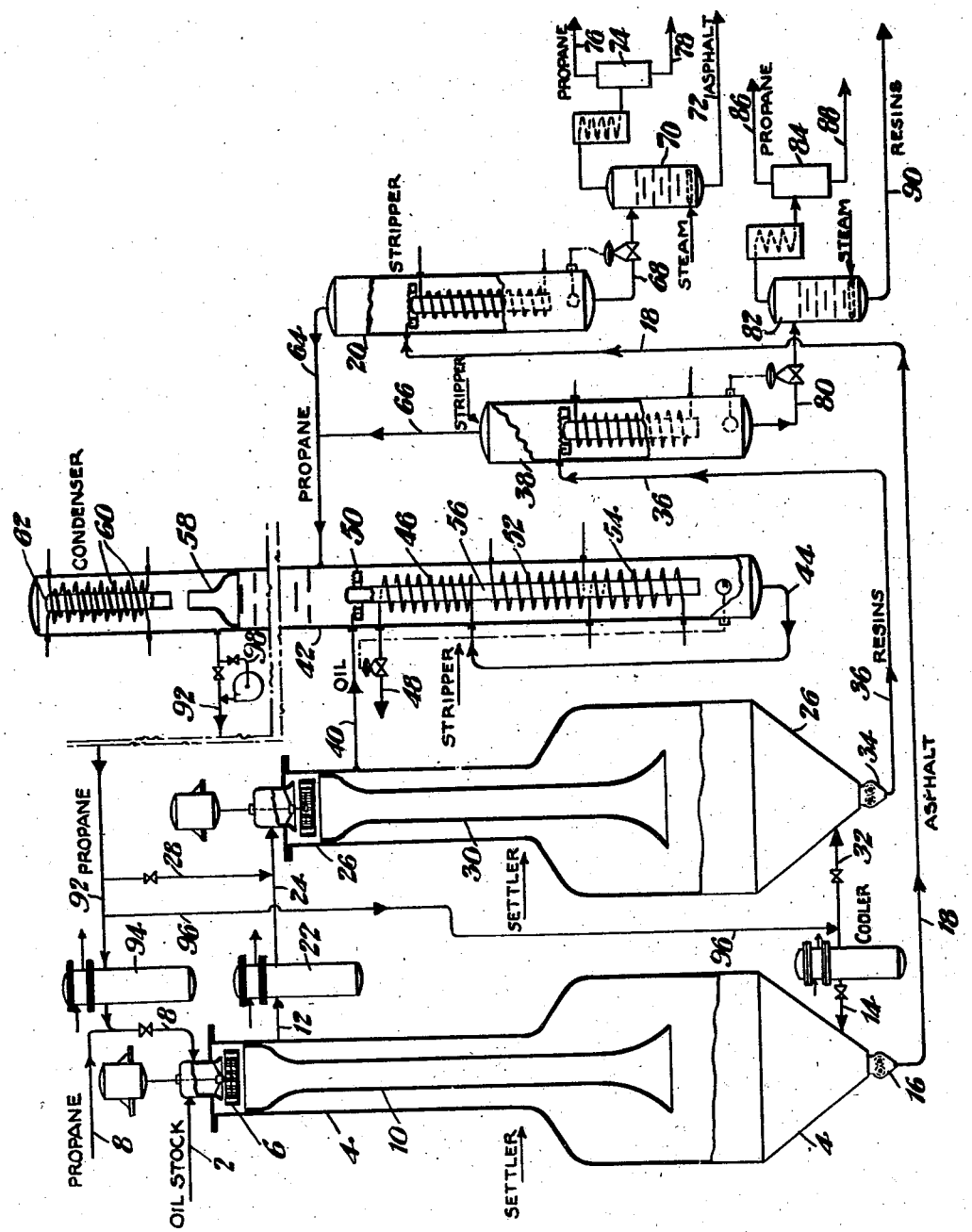

2,352,513

UNITED STATES PATENT OFFICE 2,352,513

APPARATUS FOR REFINING RESIDUAL PETROLEUM STOCKS

David G. Brandt, Westfield, N. J., assignor to Cities Service Oil Company, New York, N. Y., a corporation of Pennsylvania Application December 9, 1940, Serial No. 369,262

1 Claim. (Cl. 196—46)

This invention relates to improvements in the manufacture of asphalt-free oils and more particularly to the removal of asphalt and resins from residual petroleum oil stocks.

This application covers certain improvements in the process and apparatus of the Graff & Forrest article, published in Industrial and Engineering Chemistry, for March 1940, pages 294 to 298. The importance of removing asphaltic bodies and resins from petroleum oil stocks used in the manufacture of lubricants is indicated in this and other publications and patents. Asphalt removal is important where the oils are used for other purposes, and in the manufacture of asphalts.

The primary object of the present invention is to provide an improved process and apparatus by which asphalt and resin removal and recovery can be accomplished in a very efficient and economical manner.

Accordingly, the improved process of the present invention includes the steps of diluting the asphalt-containing residual oil with about five volumes of propane at sufficient pressure to maintain propane in liquid phase, even at temperatures approaching the critical temperature of the propane. The oil stock is completely dissolved in the propane, brought to a temperature of about 150° F. and then settled as the mixture flows downwardly through a settling zone, and then more slowly upwardly in a continuation of the settling zone. In the bottom of the settling zone, the settled asphalt is washed with propane and removed from the system. The substantially asphalt-free oil is removed from the upper part of the settling zone and brought to a dilution ratio of about ten parts of propane to one part of oil by volume, and to a temperature of approximately 200° F. Under these conditions and at approximately the same pressure as that used in the asphalt settling zone the resin is precipitated and the diluted mixture is settled in a resin-removal zone to separate out the precipitated resin. In the resin-removal zone additional wash-propane is introduced to remove high viscosity oil constituents from the settled resin bodies.

The operations further include the partial stripping of propane from the asphalt, resin and deasphalted and deresined oil at pressures about the same as that employed in the settling zones, the resulting propane vapors being condensed under substantially the same pressure and reused directly in the system. Other features are also involved in the improved process and apparatus as pointed out hereinafter.

The improved process of the present invention may be conveniently described in detail in connection with the accompanying drawing in which the single figure is a broken view partly in vertical section showing the improved apparatus of the present invention, which is particularly adapted for carrying out the improved process.

Referring to the drawing, the oil stock to be refined and which may be a topped crude oil, and have a high or low asphalt content, is introduced into the apparatus through a line 2, preferably at a temperature of about 150° F. or slightly higher. The oil first enters the upper portion of a combined mixer and settler 4, provided with a mixing element 6 mounted therein, and operated by a motor as shown. The propane diluent at a temperature of about 150° F. is introduced into the top of the settler 4 through a valved line 8 in sufficient proportion to provide about five volumes of propane to one volume of oil. The oil and propane may be introduced through suitable metering equipment not shown, to obtain the desired proportions.

As the oil and propane enter the settler 4 and the zone about the mixing element 6, they are intimately mingled and the oil brought into solution in the propane. Asphalt particles however may begin to separate out immediately, and the whole mixture is passed downwardly through an inverted funnel-like tube 10 of large diameter. When the mixture reaches the bottom of the tube 10, the asphalt being of higher specific gravity than the solution continues on down to the lower portion of the settler 4 while the oil solution flows up around the outside of the tube 10 and is discharged through a line 12 near the top of the settler 4. The lower portion of the settler 4 is enlarged so that the upward flow of the oil solution is extremely slow, thus permitting any asphalt particles to settle into the lower conical portion of the settler. In the bottom of the settler 4 the asphalt is preferably washed with propane at a temperature of about 150° F. introduced through a valved line 14 in which a cooler is mounted as shown. This propane is preferably diffused into the settled asphalt to wash out the major proportion of the oil constituents.

The washed asphalt separated out in the settler 4 and collected in the conical bottom thereof, is removed by means of a gear pump 16, and passed along with propane and a minor proportion of oil through a line 18 and sent to a high pressure stripper 20 for the removal of propane.

The deasphalted oil solution removed through the line 12 is passed through a heater 22 and brought to a temperature of about 200° F. and then conducted through a line 24 into the upper portion of a settler 26 constructed like the settler 4. In the line 24 the oil solution is diluted with hot propane to an extent sufficient to give a solution containing about ten volumes of propane to one volume of oil, the propane being introduced through a valved line 28. The increased dilution and elevated temperature of the oil solution in the settler 26 causes the precipitation of resins contained in the oil. As the mixture passes downwardly through the inverted funnel-shaped element 30, the resins precipitate and agglomerate to form bodies of higher specific gravity than that of the oil solution, so that by the time the mixture reaches the lower portion of the element 30, the resin bodies continue to settle into the bottom of the settler 26. The settled resins are washed in the conical portion of the chamber 26 with hot liquid propane introduced through a valved line 32 and the washed resins are removed by means of a gear pump 34 and passed through a line 36 into a stripper 38.

The diluted oil in 26 which is substantially free of asphalt and resins flows around the lower portion of the element 30 and upwardly through the chamber 26 to be discharged through a line 40 into a high pressure combination stripping and condensing tower 42. The oil solution introduced into the tower 42 through the line 40 is entirely too dilute if the oil is to be dewaxed. Therefore when the oil is to be dewaxed the stripping operation carried out in the lower part of the tower 42 is controlled to leave the desired proportion of propane in the oil, for example, three parts propane to one part oil by volume. The deresined and deasphalted oil containing the desired proportion of propane, is removed from the base of the tower 42 through the line 44 for dewaxing, cracking or other processing. Where the solution is to be cooled it may be passed through a spiral heat exchanger coil 46 mounted in the upper part of the stripping section of the tower 42, from which the oil is discharged through a float valve controlled line 48.

The operation carried out in the stripping section of the tower 42 includes the introduction of the solution from the line 40 into a distributor 50 which rains the solution down on the spiral heating coil 46 and lower heating coils 52 and 54. All of these coils are mounted around a central core 56 which serves to keep the solution near or on the heating coils. The lower coils are preferably heated by steam or other suitable heating medium such as hot topped crude oil to be treated, to control the temperature and composition of the solution as it descends to the bottom of the tower 42. The heating and stripping carried out in the tower 42 is at substantially the same pressure as that maintained in the settlers 4 and 26. The heating even under these conditions may be sufficient to drive off a large part of the propane if desired. In any case, the vaporized propane passes upwardly through the tower which includes a baffled section and an inverted funnel-shaped partition 58. The vapors then come in contact with cooling coils 60 mounted around a central core 62 in the condensing section of the tower. The propane condensate produced by this condensation and which may have a temperature as high as about 210° F. is collected on the tray 58 for reuse in the process.

The strippers 20 and 38 are constructed and operated in a manner similar to the stripping section of tower 42 for the purpose of removing a large part of the propane from the asphalt and resin fractions at the high pressure employed in the system. The vapors are removed from the stripper 20 through a line 64, and from the stripper 38 through a line 66, and both streams of vapors are passed directly into the tower 42 (above the stripping section) for the recovery of propane. Asphalt is removed from the stripper 20 in heated condition through a float valve-controlled line 68 in which the pressure is reduced, and by which the asphalt is conducted into a low pressure stripper 70 for the removal of the last of the propane, the stripped asphalt being discharged through a line 72. Propane and other light materials which may be present are removed overhead from the stripper 70, cooled and passed into a receiver 74. Propane is removed in vapor form through a line 76, while any condensed materials are removed through a line 78.

The resinous material collected in the bottom of the high pressure stripper 38 is removed through a float valve-controlled line 80 and conducted at low pressure into a stripper 82 for the removal of propane and other light constituents which are passed overhead, subjected to cooling, and are conducted into a receiver 84. Propane is discharged through a line 86 while any condensate is removed through a line 88. The hot resin material is discharged from the stripper 82 through a line 90. The stripping in the low pressure strippers 70 and 82 may be effected by the use of steam or any suitable hot inert gaseous stripping medium.

The asphalt removed through the line 72 and the resin material removed through the line 90 may be employed for making desirable asphaltic products. For example, the resinous material may be air-blown to convert it to an asphalt-type product which may then be blended with the desired proportion of asphalt from the line 72. Blends of any of these materials may be made with other products such as flux oil to produce asphaltic materials for particular purposes.

The condenser section 60 and tray 58 are preferably elevated with respect to the settlers 4 and 26, so that the propane condensed and collected therein may be returned to the operation by gravity flow through a valved line 92 which supplies propane at equilbrium temperature for the pressure, to lines 28 and 8; to the latter through a cooler 94. Propane for the lines 14 and 32 is also supplied from the line 92 through a connecting line 96. Since the pressure in all parts of the tower 42 is substantially the same as that in settlers 4 and 26, liquid propane will flow by gravity through the line 92 to the settlers. However, a positive flow may be obtained in the line 92 by closing the valve therein and by-passing the propane through a valved by-pass line 98 in which is mounted a circulating pump. Settler 26 is arranged for gravity flow of oil solution from settler 4, and the stripping section of tower 42 and the high pressure strippers 20 and 38 are also arranged for gravity flow from the settlers 26 and 4. The gear pumps 16 and 34 are merely used to insure positive continuous flow and not to create any substantial pressure difference. At the temperature of about 200° F. maintained in settler 26, the pressure on the system should be around 600 lbs. per square inch gauge. Under such pressures propane is vaporized in strippers 20 and 38, and the desired vaporization effected in the lower part of the tower 42 by heating, while the propane vapors are condensed by the condenser 60.

By way of an example of the effectiveness of the process of the present invention, it was found that in treating an East Texas topped crude oil of 22.6 A. P. I. gravity, 414″ viscosity at 100° F., a considerable part of the asphalt was precipitated at 80° F., but at 140° F. most of the asphalt was precipitated and it was shiny, hard and brittle. The iodine color of the resulting oil was 5,500 (the original color of the oil was 30,000), Asphalt removal at 160° F. gave an asphalt of similar character to that at 140° F., but the iodine color was down to 4720. The resin content of the oil was removed at 200° F. and an iodine color finally obtained by these treatments alone was 2,040. The resin was oily and grainy, and included some color bodies. The viscosity of the treated oil at 210° F. was 51.2″.

The process of the present invention may be employed for processing petroleum oil stocks such as topped crude oils for various purposes. One important use for suitable stocks of this type is in the manufacture of lubricating oils. Cracking stocks may also be treated to eliminate asphalt or asphalt and resin. In the latter case the stock, such as a South Coastal topped crude, may be subjected to the steps of the present process and passed directly from the bottom of the tower 42 with a considerable proportion of light hydrocarbon diluent through a heat exchanger for preheating and then directly to a cracking coil. The removal of asphaltic materials from cracking stocks in this manner will permit the use of higher temperatures in the cracking coil, and actually decrease the proportion of cracking stock left in the cracking still residue which is normally used as heavy fuel oil. Furthermore a valuable asphaltic material is also produced.

While the process of the present invention has been illustrated in connection with a specific diluent, it is to be understood that other light hydrocarbons or mixtures may be employed such for example as butane and mixtures of $C_2$, $C_3$ and $C_4$ hydrocarbons either saturated or unsaturated. If mixtures are employed they should be selected for their ability to precipitate asphalt and resin and because they are readily handled at the temperatures and pressures employed. It will be further understood that the temperatures used in the settlers 4 and 26 may differ widely for different stocks. A temperature of from 115° to 160° F. is contemplated for the settler 4 while a range of from about 140° to about 210° F. is contemplated for the settler 26.

From the foregoing description of the improved process and apparatus of the present invention, it is apparent that the apparatus is particularly designed to carry out the improved process and that it will be sufficiently flexible for the removal of asphalt and resin from oil stocks which vary widely in their content of these two undesirable constituents. Some asphalt base stocks may contain 20% or more of asphalt and as little as 2% or 3% of resins, while residual stocks of the Pennsylvania type may be very low in asphalt (1% to 4% of asphalt type constituents) but have a relatively high resin content of from 7% to about 15%. Furthermore it will be apparent that in handling residual stocks of different type slightly different temperatures will be necessary, and that for any given stock a more or less specific optimum procedure should be worked out in order to secure the most efficient operation.

Having thus described the invention in its preferred form, what is claimed as new is:

In an apparatus for separating asphaltic constituents from petroleum oils diluted with a deasphalting solvent in which the diluted oil mixture is subjected to settling for the gravity separation of asphalt, an improved settling chamber of the vertical type having a greatly enlarged lower portion, an inverted funnel-shaped member extending substantially centrally into the chamber from the upper part thereof for conducting diluted oil containing the asphalt to be settled into the lower enlarged portion of the chamber, means for removing settled asphalt from the bottom of the chamber, and means for removing asphalt-free oil solution from the upper part of the chamber outside said inverted funnel-shaped member.

DAVID G. BRANDT.